US012782274B2

(12) United States Patent
Watanabe

(10) Patent No.: US 12,782,274 B2
(45) Date of Patent: Nov. 3, 2026

(54) METHOD OF DETERMINING COMPONENT CONCENTRATION AND PROGRAM OF DETERMINING COMPONENT CONCENTRATION

(71) Applicant: JASCO Corporation, Tokyo (JP)

(72) Inventor: Keisuke Watanabe, Tokyo (JP)

(73) Assignee: JASCO Corporation, Tokyo (JP)

( * ) Notice: Subject to any disclaimer, the term of this patent is extended or adjusted under 35 U.S.C. 154(b) by 149 days.

(21) Appl. No.: 19/015,041

(22) Filed: Jan. 9, 2025

(65) Prior Publication Data

US 2025/0231103 A1 Jul. 17, 2025

(30) Foreign Application Priority Data

Jan. 11, 2024 (JP) ................................ 2024-002536

(51) Int. Cl.
*G01N 21/35* (2014.01)

(52) U.S. Cl.
CPC ..... *G01N 21/35* (2013.01); *G01N 2021/3595* (2013.01)

(58) Field of Classification Search
CPC ............... G01N 21/35; G01N 21/3563; G01N 2021/3595
See application file for complete search history.

(56) References Cited

U.S. PATENT DOCUMENTS

| | | | |
|---|---|---|---|
| 2009/0173884 A1 | 7/2009 | Nagai et al. | |
| 2009/0242770 A1 | 10/2009 | Jin | |
| 2021/0055213 A1 | 2/2021 | Kobayashi | |

FOREIGN PATENT DOCUMENTS

| | | | |
|---|---|---|---|
| JP | 2009-162667 | 7/2009 | |
| JP | 2009-236565 | 10/2009 | |
| JP | 2019045240 A * | 3/2019 | ............ G01N 33/00 |
| JP | 2020-012772 | 1/2020 | |

OTHER PUBLICATIONS

"Standard test method for substitutional atomic carbon content of silicon by infrared absorption", JEITA Standard EM-3503 with English translation, Nov. 2002.

"Test method for substitutional atomic carbon content of silicon by infrared absorption", SEMI Standard MF1391-1107 with Abstract, Oct. 2023.

* cited by examiner

*Primary Examiner* — Jurie Yun
(74) *Attorney, Agent, or Firm* — GREENBLUM & BERNSTEIN, P.L.C.

(57) ABSTRACT

A first difference spectrum between a sample spectrum of a test sample and a reference spectrum of a reference sample of which concentration of a specific component is lower than the test sample is calculated (S10); using multiple reference spectra acquired by measuring the reference sample for multiple times, a difference spectrum having a shape similar to the first difference spectrum is selected from multiple difference spectra between two reference spectra (S20); a second difference spectrum based on the selected difference spectrum and the first difference spectrum is calculated (S30); and a shape of an absorption band of the specific component is acquired from the second difference spectrum to determine the concentration of the specific component (S40).

7 Claims, 13 Drawing Sheets

(A) Fisrt difference spectra (B) Change in intensity of absorption band of carbon based on First difference spectrum Based on the similarity of the shapes of two difference spectra, reference spectra for temperature correction (combination of R_0min and R_144min) are selected and the temperature correction factor (0.406) is derived.

(A) Second difference spectra (B) Change in intensity of absorption band of carbon based on Second difference spectrum

METHOD OF DETERMINING COMPONENT CONCENTRATION AND PROGRAM OF DETERMINING COMPONENT CONCENTRATION

RELATED APPLICATION

This application claims the priority of Japanese Patent Application No. 2024-2536 filed on Jan. 11, 2024, the disclosure of which is incorporated herein by reference in its entirety.

TECHNICAL FIELD

The present invention relates to a method of determining component concentration of a sample by a spectroscopic analysis apparatus such as a Fourier transform infrared spectrometer (FTIR), for example.

BACKGROUND ART

Conventionally, a method for determining the concentration of substitutional atomic carbon in single crystal silicon using FTIR has been known. For example, in EM-3503, Standard of Japan Electronics and Information Technology Industries Association (JEITA) of Non-Patent Literature 1, a method is disclosed in which a baseline is drawn at an absorption band (near wavenumber of 605 $cm^{-1}$) specific to a substitutional atomic carbon, and the band height is multiplied by a predetermined factor to acquire the carbon concentration. The absorption band of carbon overlaps with a broad lattice absorption band of silicon; therefore, in the determination method in Non-Patent Literature 1, the absorbance spectrum of the test sample (referred to as the "sample spectrum") is measured, silicon at low substitutional carbon concentration is used as a reference sample to measure the absorbance spectrum of the reference sample (referred to as the "reference spectrum"), the difference spectrum between two spectra is calculated to remove the lattice absorption band of silicon, and the sample spectrum of only the absorption band of carbon is acquired.

Moreover, Non-Patent Literature 1 discloses that, for correction of the sample thickness, the difference spectrum between the reference spectrum multiplied by [thickness of test sample/thickness of reference sample] (that is, difference coefficient) and the sample spectrum is calculated upon calculating the difference spectrum.

The method of clarifying the absorption band of a specific component by calculating the difference spectrum between the sample spectrum and the reference spectrum (that is, "difference spectrum method") is applied, not limited to the method of determining the concentration of a component in single crystal silicon, but also to concentration analysis of slight amount of component in various samples such as the method of analyzing concentrations of multiple components in Patent Literature 1, and is a well-known method.

As shown in FIG. 2 of Patent Literature 1, shapes of spectra of five components belonging to perfluorocarbon are similar, and each has a large absorption band in the range of wavenumber 1200 to 1300 $cm^{-1}$. For example, in the sample spectrum [S] of the sample containing five components, since the only absorption peak of perfluoromethane (at wavenumber 1280 $cm^{-1}$) has a small intensity, the perfluoromethane's peak is hidden by the large absorption peaks of the other components in the absorbance spectrum of the test sample in which the five components are mixed. Therefore, a computer calculates the difference spectrum [A] of [test sample spectrum-perfluorobutane spectrum] by subtracting the spectrum of perfluorobutane with matched absorbance from the spectrum [S] of the test sample. Similarly, by sequentially subtracting the spectra of perfluoropentane, perfluoropropane, and perfluoroethane with matched absorbances from the difference spectrum [A], a difference spectrum in which the absorption band of perfluoromethane is clearly defined can be acquired as a result.

PRIOR ART

Patent Literature 1: Japanese Unexamined Patent Application Publication No. 2009-236565 A Patent Literature 2: Japanese Unexamined Patent Application Publication No. 2020-012772 A Patent Literature 3: Japanese Unexamined Patent Application Publication No. 2009-162667 A Non-Patent Literature 1: JEITA Standard EM-3503 "Standard test method for substitutional atomic carbon content of silicon by infrared absorption"

Non-Patent Literature 2: SEMI Standard MF1391-1107 "Test method for substitutional atomic carbon content of silicon by infrared absorption"

OBJECT AND SUMMARY OF INVENTION

In the method of determining component concentration using the above-described difference spectrum method, the factor that makes determination of lower concentration difficult is that the sample temperature of the measurement spot fluctuates during spectroscopic measurement. The inventors focused on the following phenomena as an influence that the fluctuation in the sample temperature affects the absorbance spectrum in the measurement of single crystal silicon.

The thickness of silicon slightly changes by thermal expansion/thermal contraction, and the absorbance intensity by lattice vibration of silicon increases/decreases in proportion to the thickness.

The lattice absorption band of silicon shifts.

Due to these phenomena, the lattice absorption band of silicon cannot be removed completely from the sample spectrum only by the conventional difference spectrum method, and a baseline suitable for the absorption band of carbon cannot be set by the remaining absorption band; therefore, determination of carbon concentration becomes inaccurate.

To avoid such problems, temperature adjustment of the test sample and the reference sample may be executed strictly upon spectral measurement. However, in the step of producing single crystal silicon for producing semiconductors, for example, there may be a product having a size that cannot be placed into a temperature adjuster of a general spectral measurement apparatus. Moreover, it becomes a demerit in terms of production cost and production time when a dedicated temperature adjuster for measuring carbon concentration is needed.

Moreover, Patent Literature 2 discloses a method of temperature-correcting the carbon concentration of single crystal silicon. The temperature correction based on the difference between the temperature-measurement values of the test sample and the reference sample is executed on the carbon concentration in single crystal silicon measured by FTIR. However, in the method of Patent Literature 2, the temperature of the test sample needs to be measured for temperature correction, and a method that does not need to measure the temperature of the sample is practically desired.

Moreover, in Patent Literature 3, a model function Ap(x) of the reference spectrum to which the wavenumber shift correction is performed is used. The model function is expressed as a model function of "$Ap(x)=a_1As(x-a_2)+a_3+a_4x$", and the factors $a_1$ to $a_4$ in the model function are numerically calculated such that the residual sum of squares D ($D=\Sigma\{As(x)-Ap(x)\}^2$) between the model function Ap(x) and the sample spectrum As(x) becomes the minimum. The factor $a_2$ is a shift correction amount. The difference spectrum between the model function and the sample spectrum (As(x)−Ap(x)) is acquired by using the model function that is constructed in terms of numerical calculation, to determine concentration based on the absorption band of the specific component that appears in this difference spectrum. However, wavenumber shift correction of Patent Literature 3 uses the model function As(x) that is set mathematically, and is on the premise that the wavenumber shift that is actually occurring applies to the model function. Therefore, it cannot be regarded as correction based on spectral data acquired by actually measuring the sample, and there is still a room for improvement in terms of reliability of wavenumber shift correction.

In the method of determining component concentration using the difference spectrum method, when the temperature of the sample fluctuates during spectroscopic measurement, the absorption intensity of other component that overlaps with the absorption band of the specific component of the sample increases/decreases and the absorption band of other component that overlaps with the absorption band of the specific component of the sample shifts (that is, wavenumber-shifts) in the wavenumber direction; therefore, the object of the present invention is to provide a temperature correction method that can solve these problems, and enable determination of lower concentration than before regarding a specific component of a sample.

SOLUTION TO PROBLEM

The inventors focused on the point that, upon measuring the spectrum of the same reference sample for multiple times by using the spectroscopic measurement apparatus for quantitative determination, the shapes of the measured reference spectra changes although the measurement condition has not been changed, and considered that such change in shapes is due to a slight fluctuation in the sample temperature. That is, in the reference spectra acquired by performing spectroscopic measurement of the reference sample for multiple times, increase/decrease of the absorption intensities of other components and a shift of the absorption band due to the fluctuation in the sample temperature occur, and these increase/decrease of the absorption intensity and the shift of the absorption band are reflected on the shape of the difference spectrum between any two reference spectra. Therefore, they found that by selecting the difference spectrum having a shape similar to the difference spectrum (first difference spectrum) between the sample spectrum and the reference spectrum based on the difference spectrum method from the difference spectra between two reference spectra having both of increase/decrease of the absorption intensity and the shift of the absorption band, and subtracting the selected difference spectrum between the reference spectra from the difference spectrum between the sample spectrum and the reference spectrum to derive the second difference spectrum, they can remove the influence due to the fluctuation in the sample temperature from the first difference spectrum, and they can determine the concentration lower than before for the specific component of the sample.

That is, a method of determining component concentration of the present invention comprises steps of:

calculating a difference spectrum, as a first difference spectrum, between:
- a sample spectrum of a test sample that shows both of an absorption band of a specific component and an absorption band of other component that overlaps with the absorption band of the specific component measured by a spectrometer, and
- a reference spectrum of a reference sample of which concentration of the specific component is lower than the test sample or concentration of the specific component is zero measured by the spectrometer;

calculating a difference spectrum between any two reference spectra which are chosen from multiple reference spectra of the reference sample measured for multiple times by the spectrometer and repeating the process to calculate multiple difference spectra, in order to correct influence of a change in the absorption band of the other component (e.g. increase/decrease of an absorbance intensity, shift of an absorption band) caused by a difference in the sample temperature;

selecting one difference spectrum having a shape similar to the first difference spectrum from the multiple difference spectra between two reference spectra; and calculating a difference spectrum between the first difference spectrum and the selected difference spectrum between two reference spectra as a second difference spectrum, wherein a shape of the absorption band of the specific component is acquired from the second difference spectrum to determine the concentration of the specific component.

Like the above-described method of the present invention, by subtracting the difference spectrum between two reference spectra having the shape similar to the shape of the first difference spectrum from the first difference spectrum (that is, by calculating the second difference spectrum), influence due to the fluctuation in the sample temperature (change in the absorption band of the other component) can be removed from the first difference spectrum, and concentration lower than before of the specific component of the sample can be determined.

Here, "multiple reference spectra" are preferably those that are measured under conditions of which the sample temperatures of the reference sample are different, but the sample temperature during spectroscopic measurement does not need to be actually measured. For example, when the sample temperature changes by the difference in irradiation time of light, multiple reference spectra under different sample temperatures can be acquired as a result by performing spectroscopic measurement of the reference sample for multiple times.

Moreover, "selecting one difference spectrum having a shape similar to the first difference spectrum from the multiple difference spectra between two reference spectra" may be performed based on the result of the evaluation of the similarity of the shapes of the two difference spectra. In particular, a wavenumber range in which influence of the change in the absorption band of the other component caused by the difference in the sample temperature (e.g. increase/decrease of the absorption intensity, shift of the absorption band) appears in the shape of the first difference spectrum may be designated as the range of the subject to be evaluated. For example, the absorption band of the other component excluding the absorption band of the specific component may be designated as the wavenumber range of evaluating the similarity of the shapes of the two difference spectra.

A band height or a band area of respective difference spectra may be used to evaluate similarity between the shapes of the two difference spectra, and the closer two values are, the higher the similarity. Moreover, in the designated wavenumber range, a width between a maximum value and a minimum value (PEAK-TO-PEAK) of a difference in intensity between the two difference spectra may be evaluated, and one of which PEAK-TO-PEAK is minimum may be selected. Moreover, for example, in the designated wavenumber range, RMS (root mean square) of the difference in intensity between the two difference spectra may be evaluated, and one of which RMS is minimum may be selected.

Moreover, in the calculation of the second difference spectrum, a ratio of band heights or a ratio of band areas of the two difference spectra may be used as a difference spectrum factor.

As described above, by selecting the difference spectrum between two reference spectra such that the similarity of the shapes of the difference spectra becomes higher in the designated wavenumber range and performing calculation of the second difference spectrum, the shape of the difference spectrum in the designated wavenumber range is cancelled. At the same time, influence of the change in the absorbance band caused by the fluctuation in the sample temperature is reduced in the entire absorption band of the other component. Accordingly, the shape of the absorption band of the specific component in the second difference spectrum appears more clearly.

Moreover, upon calculating the second difference spectrum, a first derivative spectrum of the reference spectrum may be used instead of selecting the difference spectrum between two reference spectra. That is, the method of determining component concentration of the present invention may comprise steps of:

- calculating a first derivative spectrum, respectively, for multiple reference spectra of the reference sample that have been measured by the spectrometer for multiple times;
- selecting one first derivative spectrum having a shape similar to the first difference spectrum from the multiple first derivative spectra; and
- calculating the difference spectrum between the first difference spectrum and the selected first derivative spectrum as a second difference spectrum.

Since the difference spectrum between two reference spectra and the first derivative spectrum of the reference spectrum have a similar spectral shape, like the above-described method of the present invention, influence due to the fluctuation in the sample temperature (change in the absorption band of the other component) can be removed from the first difference spectrum similarly by using the first derivative spectrum of the reference spectrum instead of the difference spectrum between two reference spectra.

A program of determining component concentration of the present invention is a program configured to achieve:

- a function of calculating a difference spectrum, as a first difference spectrum, between:
  - a sample spectrum of a test sample that shows both of an absorption band of a specific component and a broad absorption band of other component that overlaps with the absorption band of the specific component measured by a spectrometer, and
  - a reference spectrum of a reference sample of which concentration of the specific component is lower than the test sample or concentration of the specific component is zero measured by the spectrometer;
- a function of calculating a difference spectrum between any two reference spectra which are chosen from multiple reference spectra of the reference sample measured for multiple times by the spectrometer and repeating the process to calculate multiple difference spectra, in order to correct influence of a change in the broad absorption band caused by the difference in the sample temperature;
- a function of selecting one difference spectrum having a shape similar to the first difference spectrum from the multiple difference spectra between two reference spectra; and
- a function of calculating a difference spectrum between the first difference spectrum and the selected difference spectrum between two reference spectra as a second difference spectrum,
- wherein a shape of the absorption band of the specific component is acquired from the second difference spectrum to determine the concentration of the specific component.

Here, upon calculating the second difference spectrum, a first derivative spectrum of the reference spectrum may be used instead of selecting the difference spectrum between two reference spectra.

ADVANTAGEOUS EFFECTS OF INVENTION

In the multiple reference spectra acquired by measuring the reference sample for multiple times, the change in the absorption band of the other component according to the fluctuation in the sample temperature upon each measurement (e.g. increase/decrease of absorption intensity or shift of absorption band) is included. The method of the present invention uses such properties of the reference spectrum to remove influence of the fluctuation in the sample temperature included in the difference spectrum by the conventional difference spectrum method. That is, to perform temperature correction on the first difference spectrum, the difference spectrum between any two reference spectra which are chosen from multiple reference spectra of the reference sample measured for multiple times by the spectrometer is calculated, the process is repeated to calculate multiple difference spectra, the difference spectrum having a shape similar to the difference spectrum between the sample spectrum and the reference spectrum is selected from the multiple difference spectra, and the second difference spectrum is calculated based on the selected difference spectrum between two reference spectra and the difference spectra between the sample spectrum and the reference spectrum. In the difference spectrum (second difference spectrum) to which temperature correction is performed in such way, the absorption band of the specific component appears clearly, so that lower concentration than before can be determined regarding the specific component.

BEST MODE FOR CARRYING OUT THE INVENTION

In the following, an embodiment of the present invention is described with reference to the drawings. In the method of determining a substitutional carbon concentration in silicon according to the present embodiment, an FTIR apparatus having a general configuration is used. On a sample table of the FTIR apparatus, a silicon slice (sample silicon), which is a target of determination, or a reference sample (reference silicon) is placed. Here, the reference silicon is a silicon slice having a substitutional carbon concentration lower than a lower limit of detection (about 40 ppba) of the difference spectrum method according to JEITA standard of Non-Patent Literature 1. To remove carbon dioxide or water vapor in atmosphere that absorbs infrared light, a purging apparatus that introduces a purged gas such as a nitrogen gas is provided in a sample chamber and a spectroscopic instrument chamber.

Moreover, in the FTIR apparatus, a calculation apparatus that performs a calculation processing such as Fourier transformation to an interferogram which is an output from a detector, and a recording apparatus that records infrared absorbance spectra (sample spectrum, reference spectrum) acquired by measuring the sample silicon and the reference silicon, respectively are provided. In the FTIR apparatus, a movable mirror of an interferometer strokes for multiple times within a predetermined accumulation time, and accumulated values of multiple detected data are output as an infrared spectrum. In the recording apparatus, measurement condition required for determination and determination programs are stored.

Figure 1:
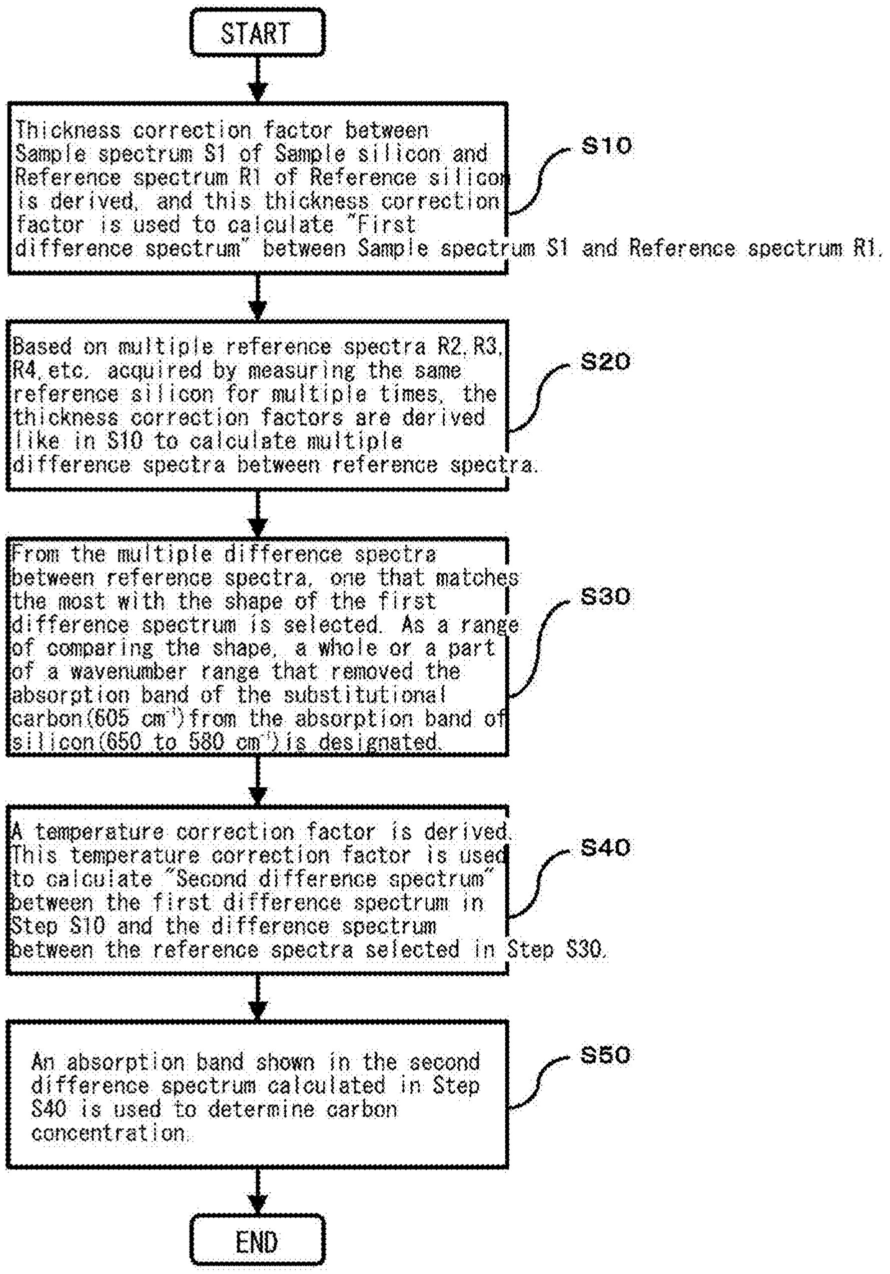
FIG. 1 is a flow diagram of a program of determining carbon concentration in a silicon wafer according to a present embodiment.

The calculation apparatus reads out the determination program stored in the recording apparatus to execute the same. FIG. 1 shows an execution flow of the determination program of determining a substitutional carbon concentration in silicon. When the program is started, the calculation apparatus reads out the sample spectrum and the reference spectrum that are measured by the FTIR apparatus, respectively, from the recording apparatus to calculate the difference between them as a "first difference spectrum" (Step S10).

Figure 2:
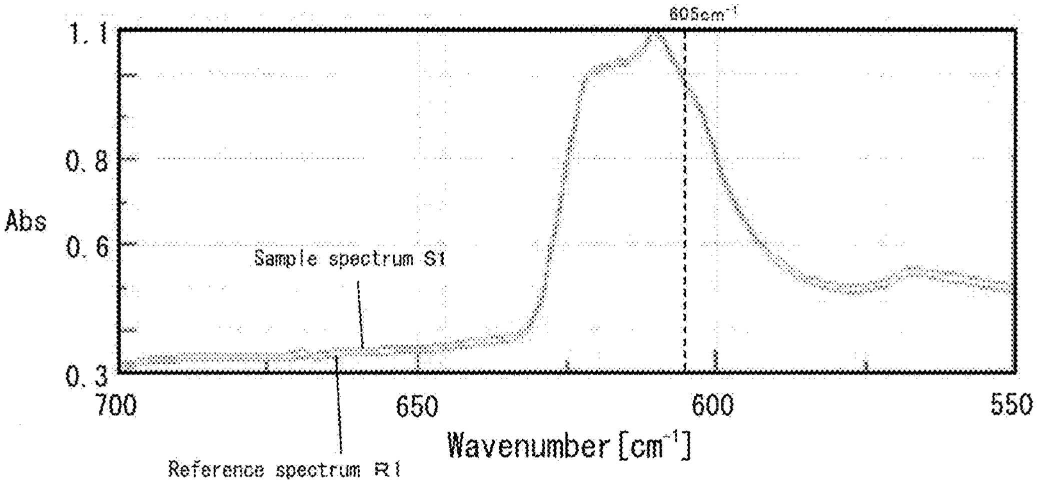
FIG. 2 is a diagram of which a sample spectrum S1 and a reference spectrum R1 are overlapped.

In FIG. 2, the sample spectrum S1 and the reference spectrum R1 that are read out are overlapped. The shapes of two spectra are almost the same, and there is a broad absorption band in a wavenumber region near 650 to 580 $cm^{-1}$. This absorption band is configured of multiple absorption bands deriving from lattice vibration of single crystal silicon, and overlaps with the absorption band of the substitutional atomic carbon. The absorption band of the substitutional atomic carbon is 605 $cm^{-1}$ at room temperature, and is 607 $cm^{-1}$ at cryogenic temperatures (below 80 K) (refer to Non-Patent Literature 2).

Figure 3:
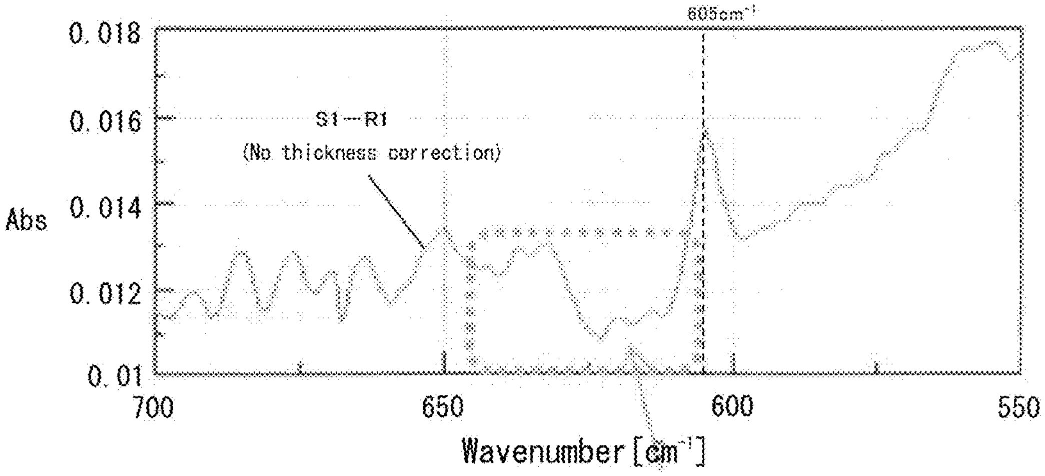
FIG. 3 is a diagram that shows a difference spectrum S1−R1 between two spectra of FIG. 2.

FIG. 3 shows a difference spectrum S1−R1 between two spectra of FIG. 2. This difference spectrum S1−R1 is a simple difference between two spectra (the difference spectrum factor is 1). There is a portion where a difference spectrum intensity changes from a relatively large region (high wavenumber side) to a relatively small region (low wavenumber side). This portion is surrounded with a broken line of FIG. 3. This phenomenon is due to a difference in temperature between the sample silicon and the reference silicon, and can be regarded as a result of (1) and (2) below.

(1) The thickness of silicon is slightly changed by expansion or contraction of silicon by heat, and an absorption intensity by lattice vibration of silicon changes in proportion thereto.

(2) The lattice absorption band of silicon shifts in a wavenumber direction.

The temperature of silicon does not depend only on an operating temperature where the FTIR is provided, but also changes when an infrared light is irradiated to silicon. Therefore, it can be said that the temperature of silicon changes during spectral measurement (during accumulation) at the FTIR apparatus. The region surrounded with the broken line of FIG. 3 is a remainder of the lattice absorption band of silicon. It affects the setting of a baseline upon calculating a height or an area of the absorption band (605 $cm^{-1}$) of the substitutional carbon, the target of determination, and an error may occur in the determination result of the substitutional carbon.

Therefore, in the present embodiment, correction to the change in the absorption intensity by lattice vibration of silicon is automatically executed in Step S10. That is, upon calculating the difference spectrum between the sample spectrum S1 and the reference spectrum R1, a factor (it is generally referred to as a difference spectrum factor, but is referred to as a thickness correction factor herein) according to the shape of the spectrum is set, and the reference spectrum R1 multiplied by the thickness correction factor is subtracted from the sample spectrum S1 (or the sample spectrum S1 multiplied by the thickness correction factor is subtracted from the reference spectrum R1) to automatically calculate the difference spectrum. This is referred to as a "first difference spectrum" herein. A method of deriving the thickness correction factor is explained with reference to FIG. 4. First, a setting range of a baseline is defined such that the lattice absorption band of silicon is included (here, it is defined as 650 to 580 $cm^{-1}$). Next, this baseline is used to read out absorption band heights (intensity of the spectrum) of the sample spectrum and the reference spectrum of each silicon. For example, the band height of 620 $cm^{-1}$ (the length of the arrow pointing up in FIG. 4) is read out. Then, the thickness correction factor is set such that the difference between two band heights becomes zero. A ratio of the band heights may be set to the thickness correction factor. Here, the absorption band height of silicon is read out at a wavenumber, not near the absorption band of the substitutional carbon, but out of the absorption band of the substitutional carbon in the setting range of the baseline.

Instead of the band height, a band area may be calculated to set the thickness correction factor such that the difference between the band areas becomes zero, and a ratio of the band areas may be set to the thickness correction factor. When using the band area, the spectrum area may be calculated based on a wavenumber range that excluded the range near the absorption band (605 $cm^{-1}$) of the substitutional carbon from the setting range of the baseline (650 to 580 $cm^{-1}$) in the example of two spectra S1, R1 of FIG. 4.

Figure 4:
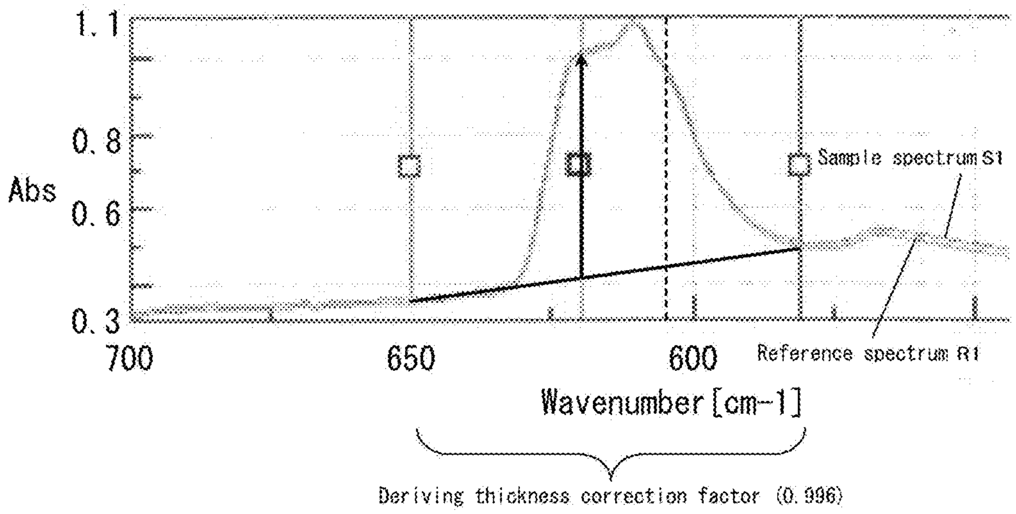
FIG. 4 is an explanatory diagram of a method of deriving a difference spectrum factor of two spectra of FIG. 2.
Figure 5:
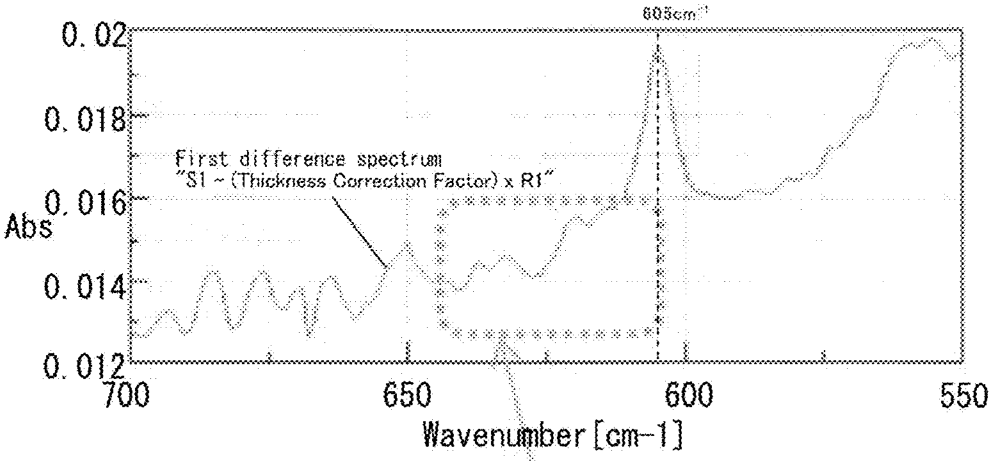
FIG. 5 is a diagram that shows a difference spectrum S1−0.996R1 between two spectra of FIG. 2.

FIG. 5 shows the first difference spectrum acquired by a calculation equation of "S1−(thickness correction factor)×R1" using the thickness correction factor (0.996 in the example of FIG. 4). In the difference spectrum in the region surrounded by the broken line in FIG. 5, the remainder of the absorption band of silicon is improved compared to FIG. 3, and the baseline set to the absorption band of the substitutional carbon, the target of determination, becomes closer to a horizontal state. That is, influence of the change in the absorption intensity by lattice vibration of silicon is suppressed.

Next, the calculation apparatus reads out information of multiple reference spectra from the recording apparatus to calculate the difference thereof (Step S20 of FIG. 1). In the recording apparatus, multiple reference spectra of the same reference silicon measured by the FTIR apparatus in advance for multiple times are stored. These multiple reference spectra are expressed as R2, R3, R4, etc. The multiple reference spectra may include the reference spectrum R1 used in Step S10. Here, the multiple reference spectra R2, R3, R4, etc. may be those that are measured under conditions in which the temperatures of the reference silicon are different, but the temperature of silicon during spectral measurement performed by the FTIR apparatus does not have to be actually measured. For example, by utilizing the point that the temperature of silicon gradually increases by the difference in irradiation time of infrared light to silicon, spectral measurement of the reference silicon is repeatedly executed for multiple times, so that the multiple reference spectra R2, R3, R4, etc. under conditions in which the temperatures of silicon are difference can be acquired as a result.

In Step S20, the calculation apparatus further extracts any two reference spectra from the multiple reference spectra R2, R3, R4, etc. to calculate the difference spectra between the multiple reference spectra.

Or, information of the difference spectra between the multiple reference spectra calculated based on the multiple reference spectra R2, R3, R4, etc. measured as described above are stored in the recording apparatus, and the calculation apparatus may read out these difference spectra between the multiple reference spectra. Having a certain reference spectrum (e.g., R2) as a standard, a data set of difference spectra between the reference spectra may be a data set of difference spectra between the reference spectrum R2 and the remaining reference spectra R3, R4, etc. Or, it may be a data set of difference spectra calculated by extracting all combinations of two reference spectra regarding the multiple reference spectra R2, R3, R4, etc.

Figure 6:
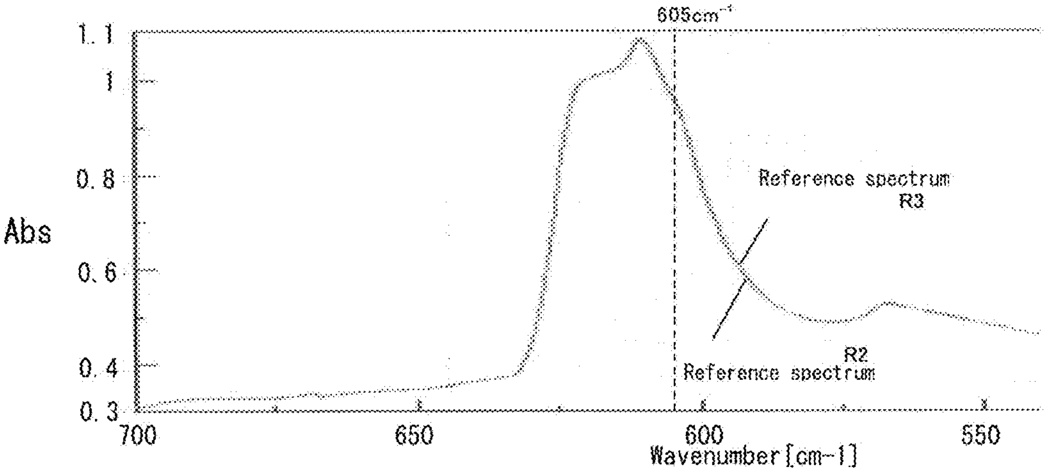
FIG. 6 is a diagram of which two reference spectra R2, R3 are overlapped, the reference spectra selected from multiple reference spectra acquired by measuring a reference silicon for multiple times.

The thickness correction factor by the setting method shown in FIG. 4 is also used upon calculating the difference spectrum in Step S20. In the example of two reference spectra R2, R3 of FIG. 6, the baseline set within the range of 580 to 650 $cm^{-1}$ is used to read out each band height of 620 $cm^{-1}$, and the thickness correction factor such that the difference between two band heights becomes zero is set. This thickness correction factor is used to calculate the difference spectrum between two reference spectra. Like in FIG. 4, the band area may be used instead of the band height to derive the thickness correction factor. Moreover, a ratio of the band heights or a ratio of the band areas may be set to the thickness correction factor.

Figure 7:
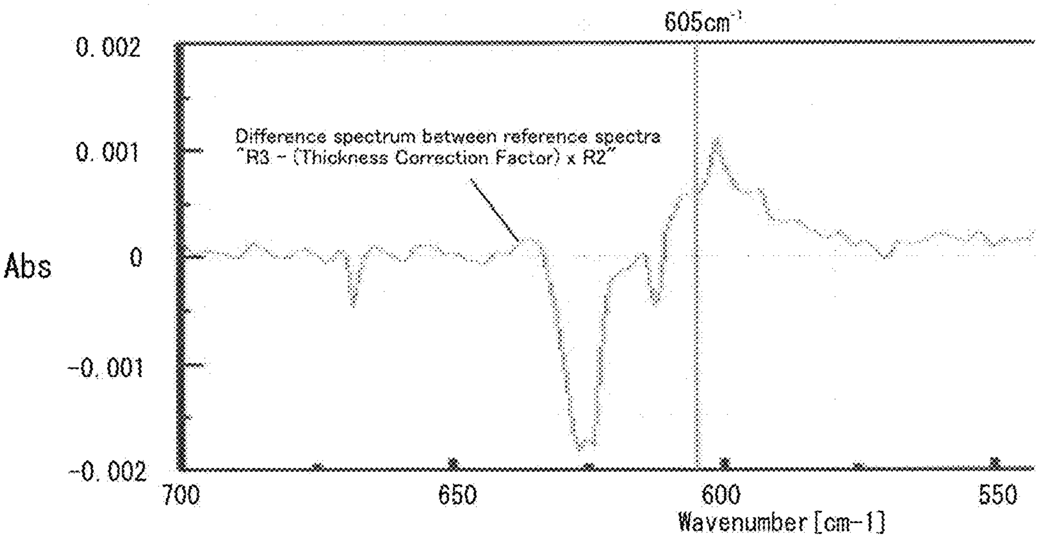
FIG. 7 is a diagram that shows a difference spectrum between the reference spectra of FIG. 6.

FIG. 7 shows an example of a difference spectrum between the reference spectra acquired by a calculation equation of "R3−(thickness correction factor)×R2" using the thickness correction factor. In the shape of the difference spectrum between the reference spectra of FIG. 7, there is a relatively deep valley (negative band) around 635 to 620 $cm^{-1}$, a relatively shallow valley (negative band) around 615 to 610 $cm^{-1}$, and a peak (positive band) around 610 to 580 $cm^{-1}$ within the range of the lattice absorption band of silicon (650 to 580 $cm^{-1}$).

The positive/negative shapes like FIG. 7 that appear in the difference spectrum between the reference spectra is a phenomenon that occurs when the absorption band of silicon of the reference spectrum R3, which is measured at a time later than the absorption band of silicon of the reference spectrum R2, is slightly shifted to the "low wavenumber side" relative to the absorption band of silicon of the reference spectrum R2. Such phenomenon occurs when the temperature of silicon when the reference spectrum R3 is measured is higher than the temperature of silicon when the reference spectrum R2 is measured.

When the difference spectrum between the reference spectra is acquired by the same calculation equation, supposing that the absorption band of silicon of the reference spectrum R3 is slightly shifted to the "high wavenumber side" relative to the absorption band of silicon of the reference spectrum R2, a difference spectrum of which positive and negative shapes of FIG. 7 are inverted is generated.

As described above, since influence of the shift of the absorption band of silicon caused by the change in the sample temperature has affected the difference spectrum between two reference spectra R2, R3 of FIG. 7 even when the same reference silicon is measured with the same FTIR apparatus, it can be said that influence of the shift of the absorption band of silicon caused by the change in the sample temperature remains in the first difference spectrum by the sample spectrum S1 and the reference spectrum R1 acquired by using the thickness correction factor of FIG. 5. Since the absorption band (605 $cm^{-1}$) of the substitutional carbon, which is the specific component, is superposed in the range where such influence of the shift of the absorption band of silicon is occurred, an error may be included in the result of determination when determination of the substitutional carbon is performed based on the first difference spectrum of FIG. 5.

Therefore, in Step S30, the calculation apparatus selects a difference spectrum having a shape similar to the first difference spectrum from the difference spectra between multiple reference spectra calculated in Step S20, and further calculates a difference spectrum (second difference spectrum) in step S40 between the first difference spectrum calculated in Step S10 and the difference spectrum between the reference spectra selected in Step S30.

Upon selection at Step S30, the shapes of two difference spectra may be compared to select one that matches the most. Particularly in the wavenumber range that removed the vicinity of the absorption band of the substitutional carbon (605 $cm^{-1}$) from the absorption band of silicon (650 to 580 $cm^{-1}$) in the first difference spectrum of FIG. 5, the shapes of the difference spectra between the reference spectra may be compared. Specifically, the shapes of the valley (negative band) around 635 to 620 $cm^{-1}$ that is in common with two difference spectra shown in FIG. 7 may be compared, for example.

Upon comparison of the shapes of two difference spectra of Step S30, the band height (or the band area) of the first difference spectrum in the designated wavenumber range and the band height (or the band area) of the difference spectrum between the reference spectra in the designated wavenumber range are compared to select the difference spectrum between the reference spectra having the closest value.

Figure 9:
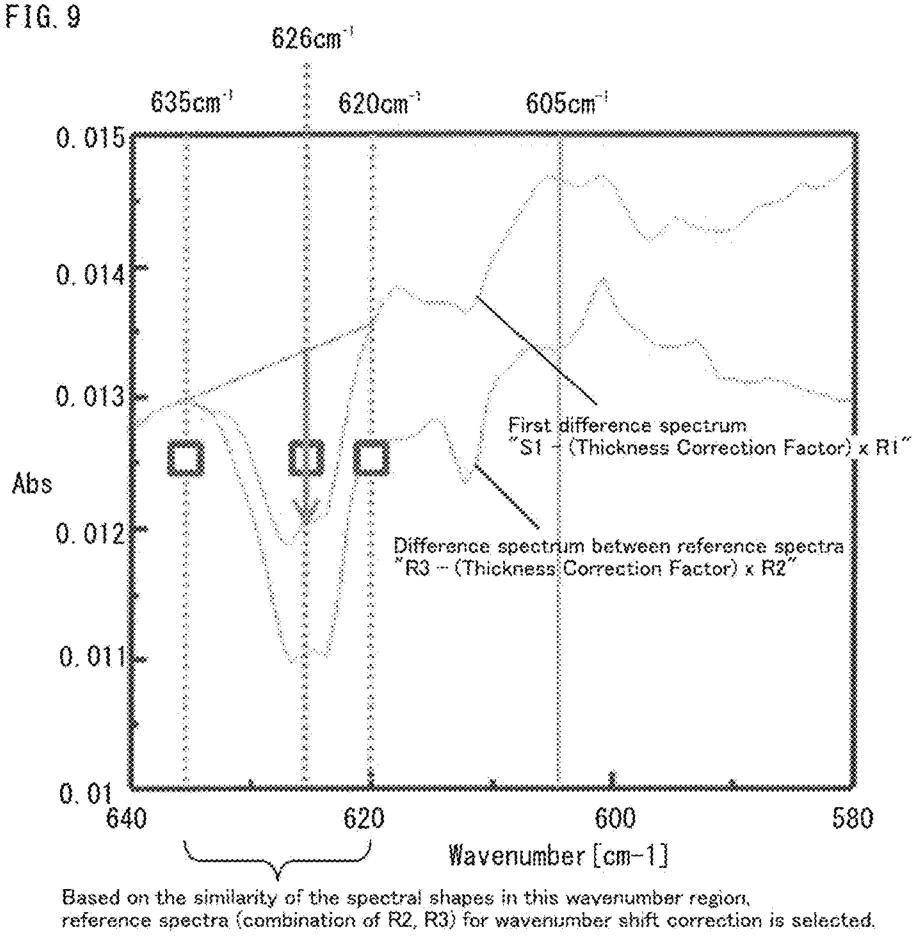
FIG. 9 is a diagram that offset-displays a difference spectrum between the first difference spectrum and the reference spectrum in a vertical axis direction.

Here, comparison of the shapes of the difference spectrum in Step S30 is explained with reference to two difference spectra (the first difference spectrum, the difference spectrum between the reference spectra) shown in FIG. 9. In FIG. 9, two difference spectra are overlapped. The upper spectrum of FIG. 9 is the first difference spectrum calculated in Step S10, and is expressed by "S1−(thickness correction factor)×R1". The lower spectrum of FIG. 9 is the difference spectrum between the reference spectra selected in Step S30, and is expressed by "R3−(thickness correction factor)×R2". When the band height (or the band area) is used, the baseline may be set to match with the valley (negative band) of the spectrum that occurs in a relatively large size in the range of 635 to 620 $cm^{-1}$, and the band height (or the band area) of 626 $cm^{-1}$ may be read out from respective difference spectra to compare them.

Or, in comparison of the shapes of two difference spectra in Step S30, in the designated wavenumber range, a width (PEAK-TO-PEAK) between the maximum value and the minimum value of the difference between two difference spectra may be evaluated to select the difference spectrum between the reference spectra such that PEAK-TO-PEAK is minimum. Or, in the designated wavenumber range, RMS (root mean square) of the difference between two difference spectra may be evaluated to select the difference spectrum between the reference spectra such that RMS is minimum.

By incorporating a software for comparing known spectral shapes, the shapes of the difference spectra can be compared effectively.

When the reference silicon is measured at regular time intervals (may be referred to as an interval measurement), the multiple reference spectra to be acquired are those that are measured under a discrete temperature condition, and when the change in the temperature of silicon is rapid, for example, there may be a case which a suitable difference spectrum between the reference spectra is not found. In such case, the time interval of acquiring the spectra may be changed to perform measurement again, or the reference spectrum that is considered to be suitable may be created by acquiring an average of two temporally preceding and succeeding reference spectra, or acquiring a virtual spectrum by interpolation or extrapolation of two reference spectra.

The designated wavenumber range is a wavenumber range where influence of the change (increase/decrease of the absorption intensity, shift of the absorption band) of the absorption band of silicon caused by the difference in the sample temperature appears strongly, and is out of the absorption band (605 $cm^{-1}$) of the substitutional carbon. In Step S30, by selecting the difference spectrum between the reference spectra which matches with the shape of the first difference spectrum the most in a wavenumber range of 635 to 620 $cm^{-1}$, for example, and calculating the second difference spectrum based on two reference spectra in the next Step S40, influence of the change in the absorption band of silicon that has remained in the calculation of the first difference spectrum can be reduced effectively. As a result, the shape of the absorption band of the substitutional carbon in the second difference spectrum acquired in Step S40 appears more clearly. Therefore, an error in determination of the substitutional carbon concentration based on the second difference spectrum in Step S50 becomes small.

Here, in Step S30, the difference spectrum between two reference spectra R2, R3 shown in FIG. 9 is presumed to be selected as the difference spectrum that matches with the shape of the first difference spectrum the most.

Upon calculating the second difference spectrum in Step S40, the band height (or the band area) of the first difference spectrum in the designated wavenumber range and the band height (or the band area) of the difference spectrum between the reference spectra in the designated wavenumber range may be read out, respectively, by the method described with reference to FIG. 9 to set a ratio of two band heights (or a ratio of the band areas) to the temperature correction factor. Then, this temperature correction factor is used to calculate the difference between two difference spectra as a "second difference spectrum".

Figure 8:
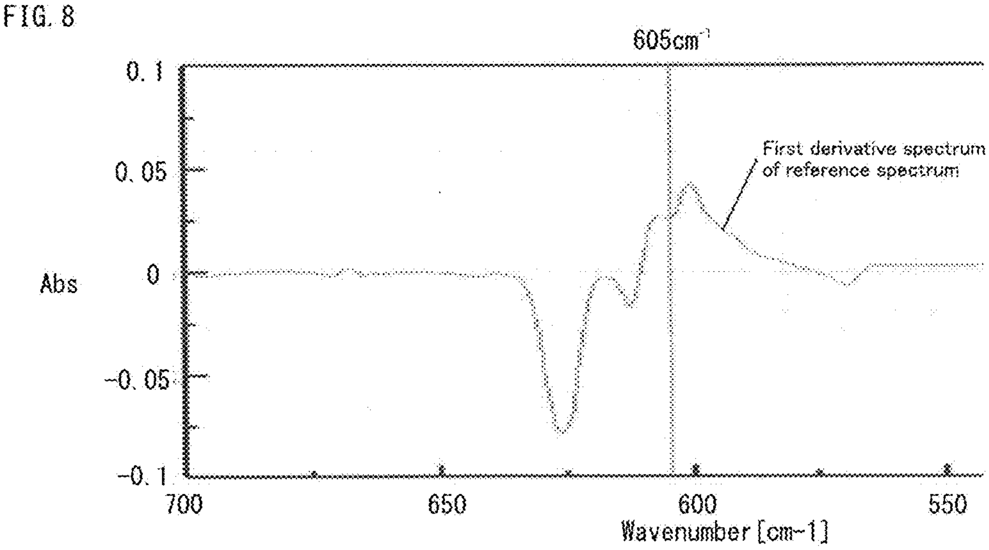
FIG. 8 is a diagram that shows a first derivative spectrum of the reference spectrum.

FIG. 8 shows a first derivative spectrum of the reference spectrum. A first derivative spectrum is one that shows a change rate in the reference spectrum, and a spectral value of the first derivative spectrum becomes zero in a wavenumber of which absorption of the reference spectrum becomes maximal, for example. The difference spectrum between two reference spectra of FIG. 7 has a spectral shape similar to that of the first derivative spectrum of the reference spectrum of FIG. 8. For example, the difference spectrum between the reference spectra of FIG. 7 and the first derivative spectrum of the reference silicon of FIG. 8 are in common in the point that they have a relatively deep valley (negative band) around 635 to 620 $cm^{-1}$, a relatively shallow valley (negative band) around 615 to 610 $cm^{-1}$, and a peak (positive band) around 610 to 580 $cm^{-1}$. Therefore, the difference spectrum between the reference spectra in Step S20 to Step S40 can be substituted with the first derivative spectrum of the reference spectrum.

That is, in Step S20, the calculation apparatus calculates respective first derivative spectra for the multiple reference spectra R2, R3, R4, etc. of the reference silicon that is measured with the FTIR for multiple times in advance, or reads out the first derivative spectra of the multiple reference spectra R2, R3, R4, etc. that are calculated in advance from the recording apparatus. In Step S30, the calculation apparatus selects the first derivative spectrum having a shape similar to the first difference spectrum from the multiple first derivative spectra. In Step S40, the second difference spectrum between the first difference spectrum and the selected first derivative spectrum is calculated.

As described above, upon calculating the first difference spectrum based on respective spectra of the sample silicon and the reference silicon in Step S10, the optimal thickness correction factor (difference spectrum factor) is used to execute correction for the change in the absorption intensity due to lattice vibration of silicon (also referred to as the change in vertical direction). Moreover, in Step S20 to Step S40, correction is automatically executed for the shift of lattice absorption band of silicon (also referred to as the change in horizontal direction).

Figure 10:
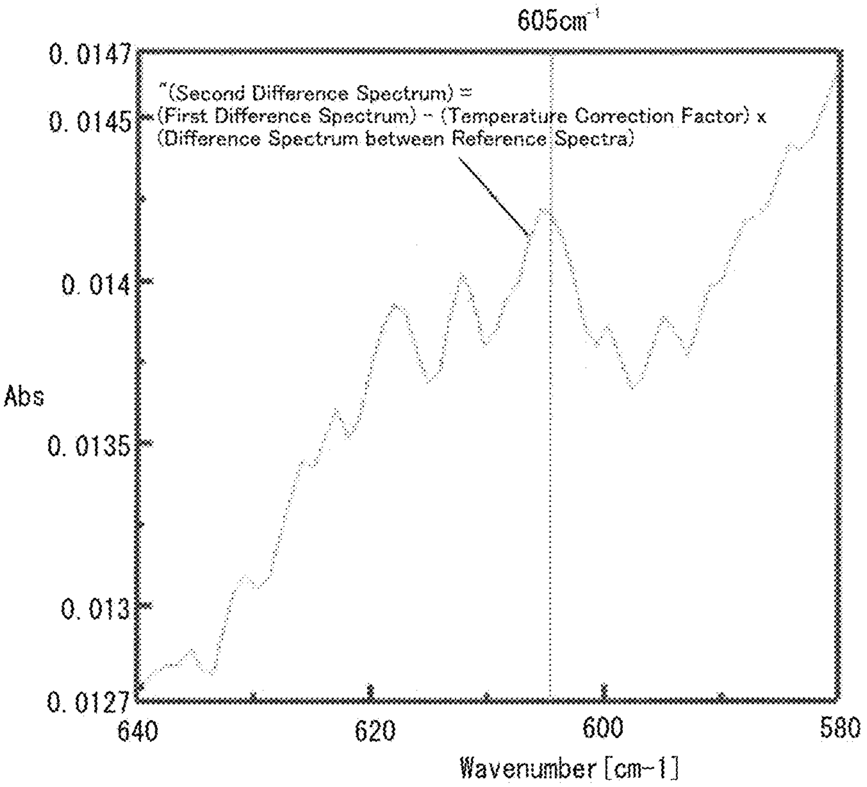
FIG. 10 is a diagram that shows a second difference spectrum based on two difference spectra of FIG. 9.

FIG. 10 is a "second difference spectrum" based on two difference spectra calculated in Step S40, and is expressed as "(first difference spectrum)−(temperature correction factor)×(difference spectrum between reference spectra)". As a result of calculating the difference spectrum in two phases, influence of the shift in a wavenumber direction of lattice absorption band of silicon is also corrected, and the shape of the absorption band of the substitutional carbon of 605 $cm^{-1}$ in the second difference spectrum appears clearly as shown in FIG. 10.

Finally, the calculation apparatus determines the carbon concentration based on the absorption band of the substitutional carbon of the second difference spectrum calculated in Step S30 (Step S50), and the flow of the determination program of the present embodiment finishes.

According to the method of determining the substitutional carbon in silicon of the present embodiment:

(1) a difference spectrum (second difference spectrum) having a reduced influence caused by the change in the temperature of silicon remaining in the difference spectrum (first difference spectrum) of the sample spectrum and the reference spectrum of silicon (the change in wavenumber of the lattice absorption band of silicon) can be acquired. As a result, the absorption band of the substitutional carbon clearly appears in the second difference spectrum, and by executing determination of the substitutional carbon concentration based on the absorption band thereof, determination of lower concentration than before can be performed.

(2) Since the numerical value of the temperature of silicon is not used for calculating a determination value, the temperature of silicon, the target of measurement, does not have to be measured necessarily, and a measurement means such as a thermometer does not need to be provided.

(3) In measurement of the reference spectrum at different silicon temperatures, a method of measuring the reference silicon for multiple times over time can be adopted. Accordingly, temperature adjustment of silicon does not have to be executed necessarily upon measurement, so that it can be applied to an FTIR apparatus having a standard configuration, and becomes a method of determination having a high versatility. Since determination can be performed without a temperature controller and temperature control of silicon, determination of a large silicon that cannot be placed into the temperature controller can be performed. Moreover, since it can be applied to determination operation of carbon concentration under ambient temperature, it can be easily introduced to production process of single crystal silicon.

On the other hand, for shortening the measurement time, a method of controlling the temperature of the reference silicon (and after confirming that the temperature has changed) and performing measurement for multiple times can also be adopted.

(4) In the determination method of Patent Literature 2, the shape of the absorption spectrum of carbon after temperature correction is not calculated; however, in the determination method of the present embodiment, the FTIR apparatus can calculate the shape of the absorption spectrum of carbon after influence of the change in the lattice absorption band of silicon caused by the change in temperature of silicon is corrected, so that the user can visually and easily confirm whether temperature correction has been executed suitably based on the shape of the absorption band.

(5) Moreover, since the lattice absorption band of silicon is proportional to the thickness of the sample, when the thickness of the reference silicon is known, the thickness of the sample silicon can be calculated by using the thickness correction factor or the temperature correction factor calculated in the present embodiment.

(6) When a good absorption band of the specific component does not appear by calculating the second difference spectrum by following the steps of the present embodiment (e.g., when the temperature change is significantly large), the measured spectral data can be removed as an abnormal data.

Moreover, as a condition of determining as the abnormal data, for example, the second difference spectrum may include a differential waveform (upward and downward band shapes that are connected side by side), for example. The computer automatically determines whether such condition is satisfied or not, and when it is determined as an abnormal data, it can encourage the user to remeasure the spectrum.

The method of determining the substitutional carbon concentration in silicon of the present embodiment is merely an example, and the determination method of the present invention is widely applied to methods of determining component concentration by the difference spectrum method using spectrometers. In particular, in a test sample such that the absorption band of other component overlaps with an absorption band of a specific component, concentration of the specific component can be suitably determined even when it is affected by influence of the change in the absorption band of other component caused by the difference in the sample temperature; therefore, it is preferred in determination of component concentration of such test samples.

In the following, the effect of the present invention is further described based on the result of a test example of determining carbon concentration in silicon using an FTIR apparatus. Measurement conditions are an example, and the present invention is not limited thereto.

<Measurement Conditions>

Detector: MCT

Measurement range: 700 to 500 $cm^{-1}$

Resolution: 2 $cm^{-1}$

Sample temperature: room temperature

Times of accumulation: 110 times/2 minutes

Here, a function of an interval measurement of the FTIR apparatus is used to acquire multiple spectra of silicon. Specifically, accumulation data for two minutes is repeatedly acquired until 146 minutes elapse after the start of measurement. For example, the spectrum of "0 min" is an accumulation data from 0 min to 2 min, and the spectrum of "144 min" is an accumulation data from 144 min to 146 min.

Two silicon of a silicon wafer having a thickness of 2 mm were used as samples. The carbon concentrations were lower than the detection limit (40 ppba) of JEITA standard of Non-Patent Literature 1. Although the specific numerical value is unknown, one that is presumed to have a lower concentration of carbon from comparison of spectra is treated as a reference silicon R, and one that is presumed to have a higher concentration of carbon is treated as a sample silicon S.

First, absorbance spectra of the sample silicon S and the reference silicon R are acquired, respectively, by an interval measurement, and recorded. Here, the sample spectra and the reference spectra of each time of 0 min, 50 min, 100 min and 144 min are expressed as in Table 1.

TABLE 1

| Measurement time | Sample silicon S | Reference silicon R |
|---|---|---|
| 0 min | Sample spectrum S-0 min | Reference spectrum R-0 min |
| 50 min | Sample spectrum S-50 min | Reference spectrum R-50 min |
| 100 min | Sample spectrum S-100 min | Reference spectrum R-100 min |
| 144 min | Sample spectrum S-144 min | Reference spectrum R-144 min |

In the present test example, the multiple reference spectra acquired by measuring the reference silicon R is used to determine carbon concentration of the sample silicon S. To clarify the effect of the present invention, multiple sample spectra measured at different measurement times are acquired regarding the sample silicon S, and carbon concentration is determined based on respective sample spectra to investigate deviation of the results of determination.

Figure 11:
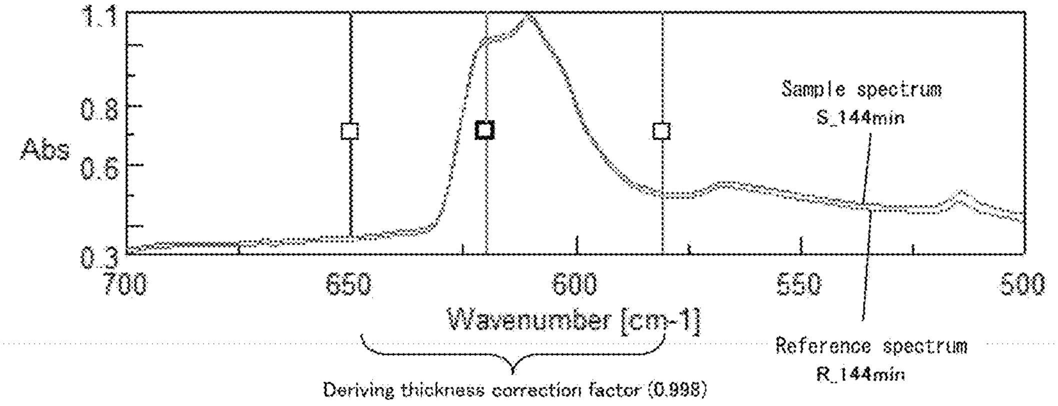
FIG. 11 is a spectral image that shows a method of deriving a thickness correction factor upon calculating a difference spectrum between a sample spectrum S_144 min and a reference spectrum R_144 min as a test example.

The first difference spectrum uses a thickness correction factor derived by a method shown in FIG. 11. In FIG. 11, the sample spectrum S_144 min and the reference spectrum R_144 min are overlapped. A baseline is set in the same range as the lattice absorption band of silicon of two spectra (650 to 580 $cm^{-1}$), and the thickness correction factor was 0.998 from the ratio of the band heights at 620 $cm^{-1}$. This thickness correction factor is used for calculating the difference spectrum between the sample spectrum S_144 min and the reference spectrum R_144 min of FIG. 11. The thickness correction factor is calculated for each combination of the sample spectrum and the reference spectrum, and each thickness correction factor is used to calculate the difference spectrum.

Figure 12:
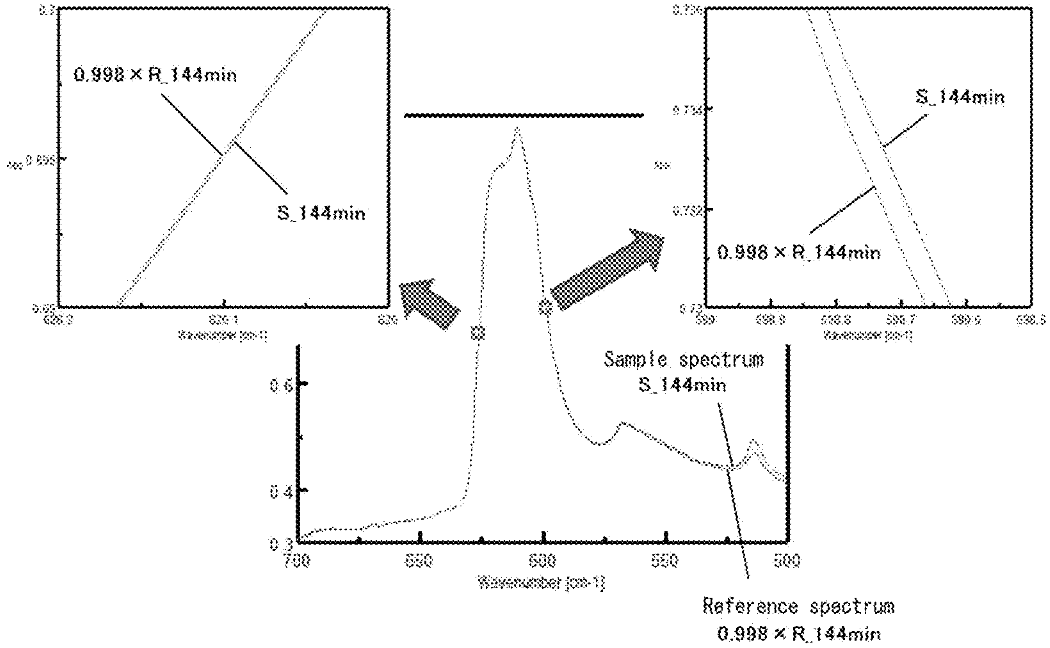
FIG. 12 is a spectral image that shows that a wavenumber shift that cannot be removed by thickness correction is present between two spectra of FIG. 11.

FIG. 12 shows overlapped spectra of the sample spectrum S_144 min in FIG. 11 and the reference spectrum R_144 min in FIG. 11 multiplied by the thickness correction factor (0.998). Moreover, enlarged views of the degree of overlap of spectra around 626 $cm^{-1}$ and around 599 $cm^{-1}$ are shown. From these enlarged views, it can be seen that the band of the sample spectrum S_144 min is shifted to a low frequency side than the band of the reference spectrum R_144 min by the difference in the temperature of silicon. That is, there is a wavenumber shift between two spectra that cannot be removed only by thickness correction.

Figure 13A:
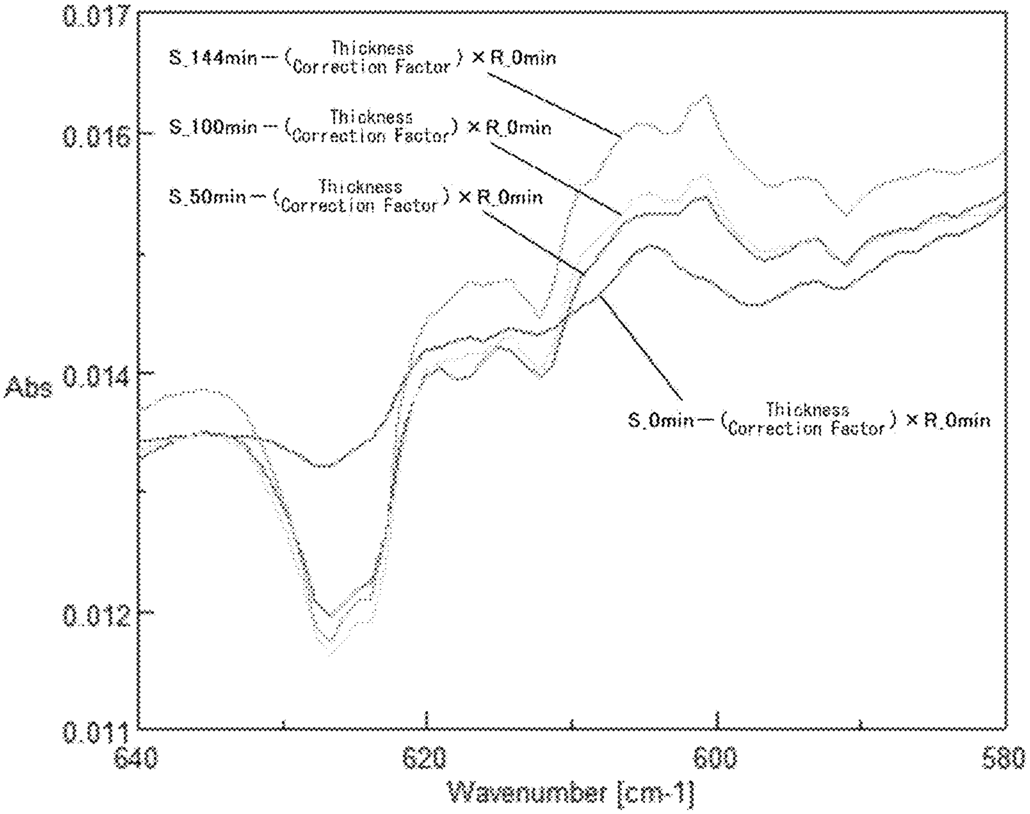
FIG. 13(A) is an image that shows the first difference spectra of the sample spectra at each measurement time (S_0 min, S_50 min, S_100 min, S_144 min)

FIG. 13(A) is an image in which the reference spectrum is set to R_0 min for the calculation, and the calculated first difference spectra of the sample spectra at each measurement time (S_0 min, S_50 min, S_100 min, S_144 min) are overlapped. As shown in FIG. 12, these first difference spectra in FIG. 13(A) are based on the sample spectra of the same sample silicon S; however, since the lattice absorption band of single crystal silicon (630 to 580 $cm^{-1}$) has shifted by the slight change in the temperature of silicon upon measurement, absorption band of silicon cannot be removed completely only by thickness correction, and the difference spectrum shapes have largely changed. Since an infrared light is continuously irradiated to silicon for measurement, it is predicted that the temperature of silicon at the measurement time 0 min is the lowest, and the temperature of silicon goes higher as the measurement time passes. The changes in the difference spectrum shapes like in FIG. 13(A) are caused by the shift of the absorption band of silicon.

Figure 13B:
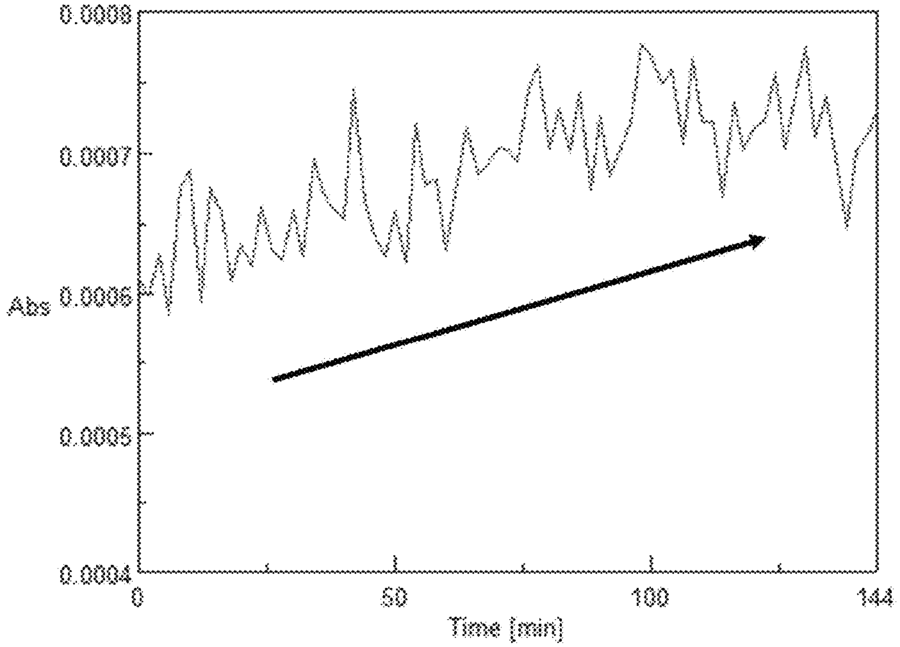
FIG. 13(B) is an image that shows a time dependent change in an absorption band intensity of carbon based on the first difference spectrum of the sample spectrum at the measurement time of 0 min to 144 min.

FIG. 13(B) shows a time dependent change of a carbon absorption band intensity at 605 $cm^{-1}$ based on the first difference spectrum between the sample spectrum at the measurement time of 0 min to 144 min, and it can be seen that the moving average of the carbon absorption band intensity increases as the measurement time passes. Accordingly, as for the first difference spectrum, influence of the change in the temperature of silicon needs to be corrected.

Next, a method of selecting a combination of the reference spectra for performing temperature correction to the first difference spectrum is described with reference to FIG. 14. At the upper side of the image of FIG. 14, the first difference spectrum (S_0 min−(thickness correction factor)×R_100 min) that needs to be subjected to temperature correction is shown. Here, the reference spectra R_0 min to R_144 min of the reference silicon measured at the measurement time of 0 min to 146 min are used to select the combination of the reference spectra for temperature correction. Specifically, these reference spectra R_0 min to R 144 min are used to calculate the difference spectra between multiple reference spectra, and one that matches with the shape of the first difference spectrum the most is selected. For example, at the lower side of the image of FIG. 14, the difference spectrum (R_144 min−(thickness correction factor)×R_0 min) of which thickness correction based on two reference spectra R_0 min and R_144 min is considered is shown. To two difference spectra shown in FIG. 14, the band heights at 626 $cm^{-1}$ are read out, respectively, by using the baseline drawn in the designated wavenumber range (635 to 620 $cm^{-1}$) to calculate the ratio of the band heights. Similarity of the shapes of two difference spectra shown in FIG. 14 is evaluated by this ratio of the band heights.

Figure 14:
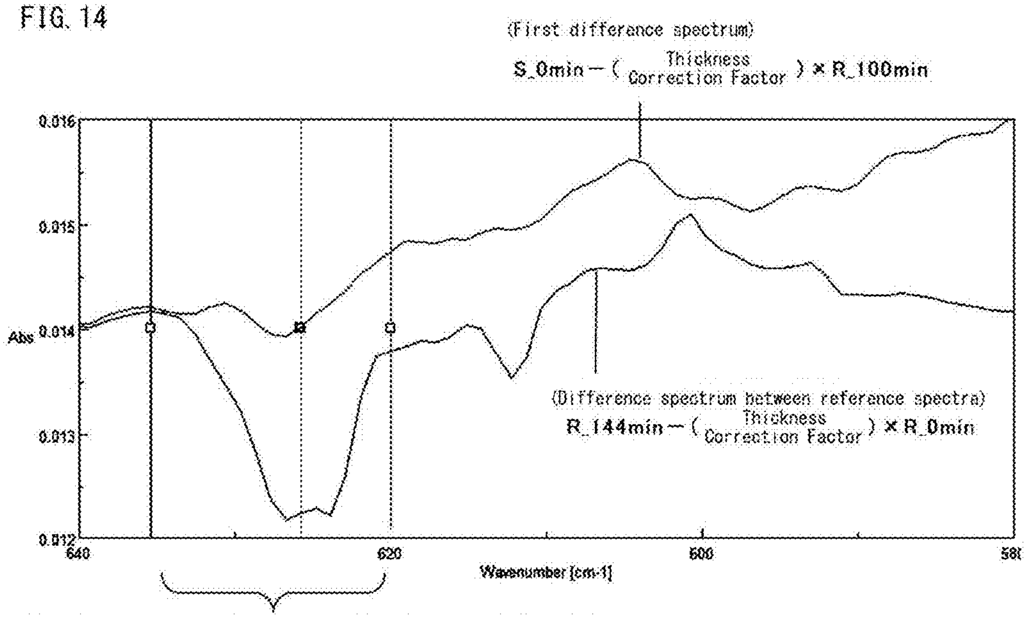
FIG. 14 is an image that shows a method of selecting a combination of the reference spectra (R_0 mim, R_144 min) for temperature correction to a first difference spectrum (S_0 min−(thickness correction factor)×R_100 min).

As for the difference spectra between various combinations of the reference spectra based on the reference spectra R_0 min to R_144 min, the ratio of the band heights is calculated, respectively, like FIG. 14 to select the difference spectrum between the reference spectra of which the ratio of the band heights is smallest. Here, the difference spectrum between the reference spectra shown in FIG. 14 (R_144 min−(thickness correction factor)×R_0 min) is selected for temperature correction. Then, the ratio of the band heights calculated from the difference spectrum between the reference spectra and the first difference spectrum (0.406) is set to the temperature correction factor, and the second difference spectrum is calculated by using this temperature correction factor.

Figure 15A:
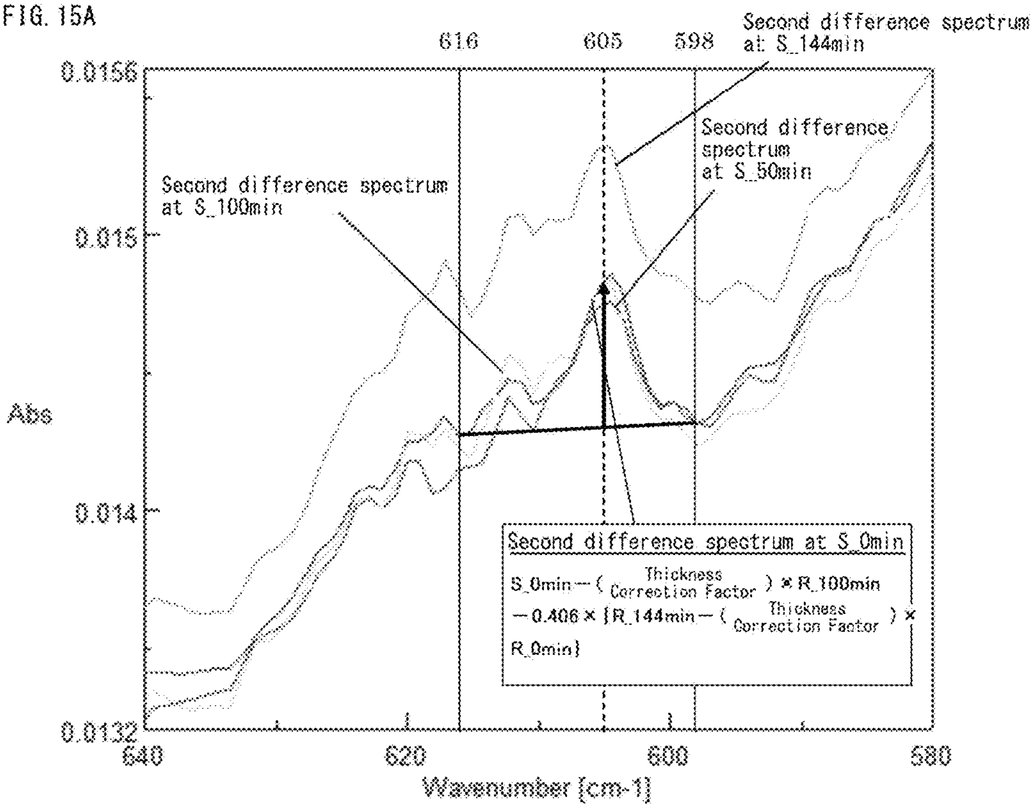
FIG. 15(A) is an image that shows the second difference spectra of the sample spectra at each measurement time (S_0 min, S_50 min, S_100 min, S_144 min)

In FIG. 15(A), the second difference spectra of each measurement time (S_0 min, S_50 min, S_100 min, S_144 min) are overlapped. Here, the second difference spectra are calculated by using (A) the first difference spectra of the sample spectra (S_0 min, S_50 min, S_100 min, S_144 min) of each measurement time calculated with the fixed reference spectrum at R_100 min, and FIG. 15(B) the difference spectra between the reference spectra which are selected for each of the first difference spectrum. For example, by using the above-described temperature correction factor (0.406), the second difference spectrum for the measurement time S_0 min is expressed as "S_0 min−(thickness correction factor)×R 100 min−0.406×{R_144 min−(thickness correction factor)×R_0 min}".

It can be seen that, in the second difference spectrum of FIG. 15(A), the shape of the absorption band (605 $cm^{-1}$) of the substitutional carbon is improved by temperature correction, and the shapes of all measurement times are plausible compared to FIG. 13(A).

Figure 15B:
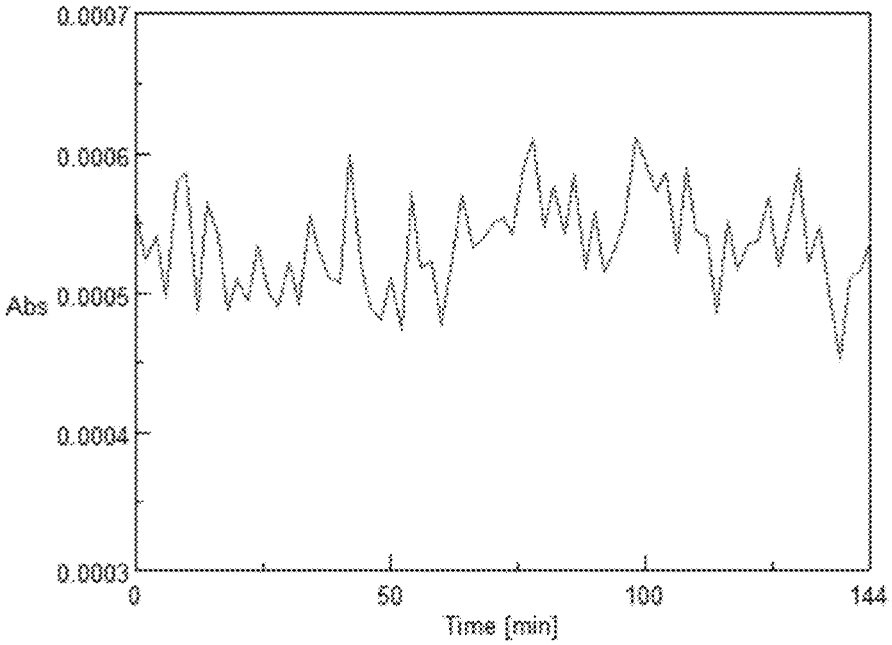
FIG. 15(B) is an image that shows a time dependent change in an absorption band intensity of carbon based on the second difference spectrum of the sample spectrum at the measurement time of 0 min to 144 min.

Moreover, to the second difference spectrum of FIG. 15(A), the baseline drawn in the designated wavenumber range (616 to 598 $cm^{-1}$) was used to read out the band heights of the absorption band (605 $cm^{-1}$) of the substitutional carbon, respectively. FIG. 15(B) shows the time dependent change of the carbon absorption band intensity based on the second difference spectrum between the sample spectrum at the measurement time of 0 min to 144 min.

As for the first difference spectrum of FIG. 13(B), the change in the band intensity was large, and the moving average of the band intensity was not constant and gradually increased. The determination value (average value) based on this band was 13.00 ppba, and the standard deviation SD was 0.906 ppba.

On the other hand, as for the second difference spectrum of FIG. 15(B), the change in the band intensity became relatively small, and the value of the moving average of the band intensity became almost constant. The determination value (average value) based on this band was 10.11 ppba, and the standard deviation was 0.670 ppba. That is, the detection limit from the 3σ method is 0.67×3=2 ppba=0.002 ppma, which is almost one twentieth of the detection limit 0.04 ppma in JEITA standard of Non-Patent Literature 1, and it is a numerical value that sufficiently shows usability of the present invention. According to the method of determination of the present invention, an extremely low carbon concentration of about 10 ppba can be determined stably.

From the above results, it can be said that not only by performing thickness correction, but also by performing correction to the shift of the absorption band of silicon, the shape of the difference spectrum is improved, and determination of carbon concentration at a stable state can be performed. Moreover, it is considered that a carbon concentration value close to a true value is acquired.

REFERENCE SIGNS LIST

S10 to S50: Step S10 to Step S50
S1: Sample spectrum
R1, R2, R3: Reference spectrum

The invention claimed is:

1. A method of determining component concentration comprising steps of:
calculating a difference spectrum, as a first difference spectrum, between:
a sample spectrum of a test sample that shows both of an absorption band of a specific component and an absorption band of other component that overlaps with the absorption band of the specific component measured by a spectrometer, and
a reference spectrum of a reference sample of which concentration of the specific component is lower than the test sample or concentration of the specific component is zero measured by the spectrometer;
calculating a difference spectrum between any two reference spectra which are chosen from multiple reference spectra of the reference sample measured for multiple times by the spectrometer and repeating the process to calculate multiple difference spectra, in order to correct influence of a change in the absorption band of the other component caused by a difference in a sample temperature;
selecting one difference spectrum having a shape similar to the first difference spectrum from the multiple difference spectra between two reference spectra; and
calculating a difference spectrum between the first difference spectrum and the selected difference spectrum between two reference spectra as a second difference spectrum,
wherein a shape of the absorption band of the specific component is acquired from the second difference spectrum to determine the concentration of the specific component.

2. The method of determining component concentration of claim 1, wherein
upon selecting one difference spectrum having a shape similar to the first difference spectrum from the multiple difference spectra between two reference spectra, the absorption band of the other component excluding the absorption band of the specific component is designated as a wavenumber range of evaluating the similarity of the shapes of the two difference spectra.

3. The method of determining component concentration of claim 2, wherein
a band height or a band area of respective difference spectra is used, or a width between a maximum value and a minimum value (PEAK-TO-PEAK) of a difference in intensity between the two difference spectra or RMS (root mean square) of a difference in intensity between the two difference spectra is used for evaluation of the similarity of the shapes of the two difference spectra.

4. The method of determining component concentration of claim 3, wherein
a ratio of band heights or a ratio of band areas is used as a difference spectrum factor upon calculating the second difference spectrum.

5. A method of determining component concentration comprising steps of:
calculating a difference spectrum, as a first difference spectrum, between:
a sample spectrum of a test sample that shows both of an absorption band of a specific component and an absorption band of other component that overlaps with the absorption band of the specific component measured by a spectrometer, and
a reference spectrum of a reference sample of which concentration of the specific component is lower than the test sample or concentration of the specific component is zero measured by the spectrometer;
calculating a first derivative spectrum, respectively, for multiple reference spectra of the reference sample that have been measured for multiple times by the spectrometer, in order to correct influence of a change in the absorption band of the other component caused by a difference in a sample temperature;
selecting one first derivative spectrum having a shape similar to the first difference spectrum from the multiple first derivative spectra; and
calculating a difference spectrum between the first difference spectrum and the selected first derivative spectrum as a second difference spectrum, wherein a shape of the absorption band of the specific component is acquired from the second difference spectrum to determine the concentration of the specific component.

6. A program of determining a substitutional carbon concentration in silicon, the program that is configured to achieve:

a function of calculating a difference spectrum, as a first difference spectrum, between:

a sample spectrum of a test sample that shows both of an absorption band of a specific component and a broad absorption band of other component that overlaps with the absorption band of the specific component measured by a spectrometer, and a reference spectrum of a reference sample of which concentration of the specific component is lower than the test sample or concentration of the specific component is zero measured by the spectrometer;

a function of calculating a difference spectrum between any two reference spectra which are chosen from multiple reference spectra of the reference sample measured for multiple times by the spectrometer and repeating the process to calculate multiple difference spectra, in order to correct influence of a change in the broad absorption band caused by a difference in a sample temperature;

a function of selecting one difference spectrum having a shape similar to the first difference spectrum from the multiple difference spectra between two reference spectra; and a function of calculating a difference spectrum between the first difference spectrum and the selected difference spectrum between two reference spectra as a second difference spectrum, wherein a shape of the absorption band of the specific component is acquired from the second difference spectrum to determine the concentration of the specific component.

7. A program of determining a substitutional carbon concentration in silicon, the program that is configured to achieve:

a function of calculating a difference spectrum, as a first difference spectrum, between:

a sample spectrum of a test sample that shows both of an absorption band of a specific component and a broad absorption band of other component that overlaps with the absorption band of the specific component measured by a spectrometer, and a reference spectrum of a reference sample of which concentration of the specific component is lower than the test sample or concentration of the specific component is zero measured by the spectrometer;

a function of calculating a first derivative spectrum, respectively, for multiple reference spectra of the reference sample that has been measured for multiple times by the spectrometer, in order to correct influence of a change in the broad absorption band caused by a difference in a sample temperature;

a function of selecting one first derivative spectrum having a shape similar to the first difference spectrum from the multiple first derivative spectra; and a function of calculating a difference spectrum between the first difference spectrum and the selected first derivative spectrum as a second difference spectrum, wherein a shape of the absorption band of the specific component is acquired from the second difference spectrum to determine the concentration of the specific component.

* * * * *